No. 683,736. Patented Oct. 1, 1901.
J. G. EBKEN.
FRICTION BRAKE.
(Application filed Feb. 18, 1901.)
(No Model.)
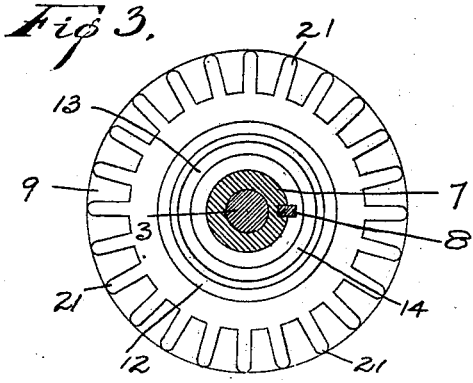
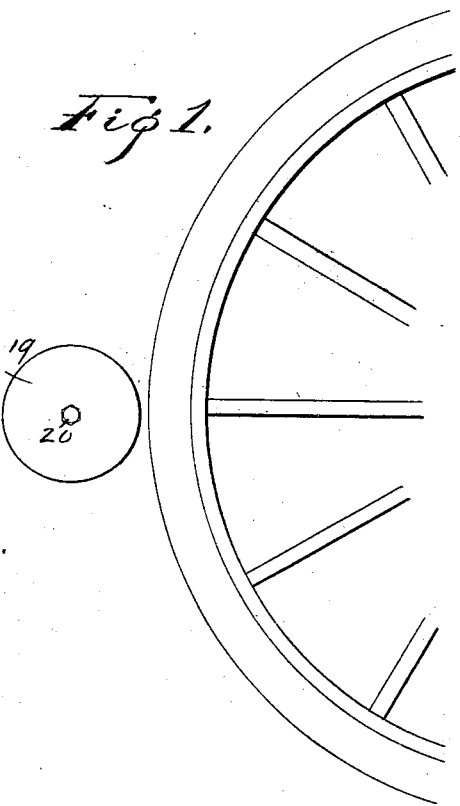
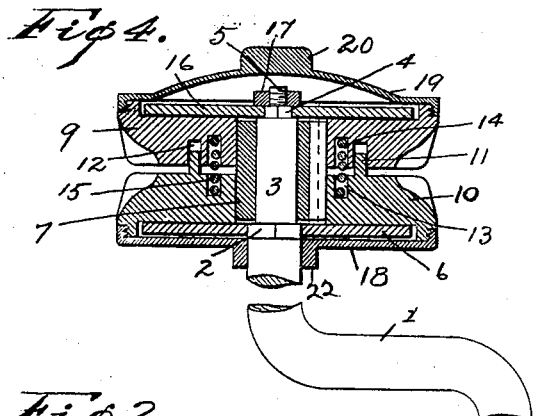
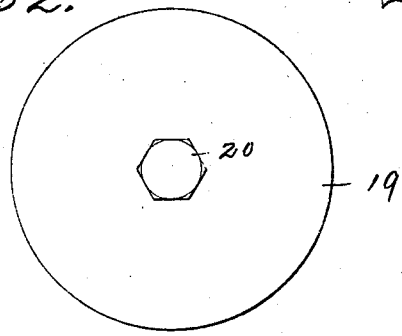
WITNESSES:
INVENTOR.
John G. Ebken
BY
ATTORNEY.

UNITED STATES PATENT OFFICE.

JOHN G. EBKEN, OF PITTSBURG, PENNSYLVANIA, ASSIGNOR OF ONE-HALF TO JOHN H. STEVENSON AND HENRY W. STEVENSON, OF SAME PLACE.

FRICTION-BRAKE.

SPECIFICATION forming part of Letters Patent No. 683,736, dated October 1, 1901.

Application filed February 18, 1901. Serial No. 47,744. (No model.)

*To all whom it may concern:*

Be it known that I, JOHN G. EBKEN, a citizen of the United States of America, residing at Pittsburg, in the county of Allegheny and State of Pennsylvania, have invented certain new and useful Improvements in Friction-Brakes; and I do hereby declare the following to be a full, clear, and exact description thereof, reference being had to the accompanying drawings, which form a part of this specification.

This invention relates to certain new and useful improvements in friction-brakes for carriages and other vehicles.

The object of my invention is to provide a brake for the above class of vehicles employing rubber tires.

In the accompanying drawings I have illustrated my improved brake, in which—

Figure 1 is a side elevation of a portion of a vehicle-wheel, showing my brake in an inoperative position. Fig. 2 is an enlarged side elevation of the same. Fig. 3 is a longitudinal sectional view through the same. Fig. 4 is a cross-section through the same.

In said drawings the numeral 1 designates a suitable crank-shaft having the square shoulder 2, the reduced rounded portion 3, the outer square shoulder 4, and the threaded portion 5 thereon. Mounted upon the square portion 2 of said crank-shaft is the disk 6. Loosely mounted upon the rounded portion 3 of said shaft is the sleeve 7, carrying a key 8. A pair of shoes 9 and 10 are mounted upon said sleeve, each of which is provided with a keyway to engage with the sleeve-key. The inner face portion of one of these shoes is provided with an annular flange 11, which engages within a groove 12 in the face of the other shoe. Annular grooves 13 and 14 are formed within the inner faces of both shoes for the reception of a spiral spring 15. Fitted upon the square shouldered portion 4 of the shaft is a disk 16, which is secured in position by a nut 17, applied to the threaded portion 5. A head 18 is fitted over the crank-shaft and threaded securely to the shoe 10 and provided at its center with an extension or nut 22. Another head 19 is fitted threadably upon the shoe 9 and is provided at its center with an extension or nut 20. These caps or heads 18 and 19 are designed to protect the disks 6 and 16 from dirt, &c. The face portion of each shoe wherein it is intended to engage with the wheel-tire is provided with radiating ribs 21. These ribs prevent the tire from slipping, especially when wet. The crank-shaft is suitably mounted to the vehicle brake-beam and carries at each of its ends a brake of this construction.

When the brakes are brought into contact with the wheel-tire, the shoes 9 and 10 rotate and have a tendency to spread apart or be thrust sidewise, causing the outer faces of said shoes to bear against the stationary disks 6 and 16, thereby creating sufficient friction to stop the motion of the wheels, and as the brake-shoes rotate with said wheels all possibility of "tearing" or cutting of the tires is prevented.

The object of the radiating ribs 21 is as heretofore described.

The spiral spring having an outward pressure on the shoes prevents "rattling," and the flange 11 prevents sand or dirt entering the working parts between the shoes.

The construction of my improved brake is such that it may easily and quickly be taken apart for repairs. Again, the device is compact and not liable to get out of order.

A means for lubricating the disks on either side may be provided near the periphery of each shoe part to prevent a too-rapid wear of the same.

Having thus fully shown and described my invention, what I claim as new, and desire to secure by Letters Patent, is—

1. In a friction-brake having a shoe composed of two parts, rotatably mounted upon a shaft with non-rotatable friction-disks mounted upon the same shaft to engage the shoe parts; the heads secured to said shoe parts to inclose said disks; and an antirattler-spring arranged between said shoe parts, as shown and set forth.

2. In a friction-brake having a shoe composed of two parts, rotatably mounted upon a shaft, with non-rotatable friction-disks mounted upon the same shaft to engage the shoe parts; the heads secured to said shoe parts to inclose the friction-disks; an annular flange upon the inner face of one of said parts to enter a groove in the other part; and the antirattler-spring arranged between said shoe parts, as shown and set forth.

3. In a friction-brake having a shoe composed of two parts rotatably mounted upon a shaft, with non-rotatable friction-disks mounted upon the same shaft to engage the shoe parts; the heads secured to said shoe parts to inclose said disks; the ribs formed upon the wheel-engaging surfaces of said shoe parts; an annular flange upon the inner face of one of said shoe parts to engage within a groove in the other part, and the antirattler-spring interposed between said shoe parts; as shown and set forth.

In testimony whereof I have hereunto affixed my signature in the presence of two subscribing witnesses.

JOHN G. EBKEN.

Witnesses:
HENRY W. STEVENSON,
S. G. BARNES.